US006726810B2

(12) United States Patent
Bauer

(10) Patent No.: US 6,726,810 B2
(45) Date of Patent: Apr. 27, 2004

(54) APPARATUS FOR SMOOTHENING A PAPER WEB BEFORE COATING

(75) Inventor: Donald G. Bauer, Laurel, MD (US)

(73) Assignee: MeadWestvaco Corporation, Stamford, CT (US)

( * ) Notice: Subject to any disclaimer, the term of this patent is extended or adjusted under 35 U.S.C. 154(b) by 37 days.

(21) Appl. No.: 10/242,464

(22) Filed: Sep. 13, 2002

(65) Prior Publication Data

US 2003/0006018 A1 Jan. 9, 2003

Related U.S. Application Data

(62) Division of application No. 09/791,866, filed on Feb. 26, 2001, now Pat. No. 6,485,611
(60) Provisional application No. 60/185,168, filed on Feb. 25, 2000.

(51) Int. Cl.[7] ................................. D21G 9/00
(52) U.S. Cl. .............. 162/361; 162/360; 162/266; 100/74; 100/162 R; 100/153; 118/126; 34/114
(58) Field of Search .................... 162/361, 204–26, 162/360.2–360.3, 265–266, 289; 100/74, 162 R, 153, 38, 47, 193, 137; 118/100, 126, 101; 34/95, 114

(56) References Cited

U.S. PATENT DOCUMENTS

| | | | | | |
|---|---|---|---|---|---|
| 1,629,681 | A | * | 5/1927 | Cram | 100/162 R |
| 2,251,890 | A | * | 8/1941 | Montgomer | 162/206 |
| 4,596,633 | A | * | 6/1986 | Attwood | 162/206 |
| 4,671,173 | A | * | 6/1987 | Boissevain | 100/38 |
| 4,786,529 | A | * | 11/1988 | Boissevain | 427/296 |
| 5,122,232 | A | * | 6/1992 | Lyman et al. | 162/198 |
| 5,314,119 | A | * | 5/1994 | Watt | 239/220 |
| 5,378,497 | A | * | 1/1995 | Johnson et al. | 427/211 |
| 5,505,820 | A | * | 4/1996 | Donigian et al. | 162/206 |
| 5,522,312 | A | * | 6/1996 | Johnson | 100/74 |
| 5,607,553 | A | * | 3/1997 | Chadha | 162/205 |
| 5,938,895 | A | * | 8/1999 | Hirvonen | 162/205 |
| 6,073,549 | A | * | 6/2000 | Winheim et al. | 100/74 |
| 6,280,574 | B1 | * | 8/2001 | Bauer | 162/206 |
| 6,401,355 | B1 | * | 6/2002 | Linnonmaa et al. | 34/114 |

* cited by examiner

Primary Examiner—José A. Fortuna
(74) Attorney, Agent, or Firm—Donald L. Bowman

(57) ABSTRACT

A paper web is smoothened by passing the web through a pre-calender device on a paper machine before the application of a coating. The pre-calender device comprises at least one pair of steel rolls, one of which is heated, and a liquid application device which applies a thin film of water to the surface of the web which contacts the heated roll before the web enters the nip between the rolls. The web is then dried after exiting the nip either by wrapping the heated roll and/or by applying heat externally to the web.

8 Claims, 4 Drawing Sheets

APPARATUS FOR SMOOTHENING A PAPER WEB BEFORE COATING

CROSS RELATED APPLICATIONS

This non-provisional application claims the benefit of U.S. Provisional Application Ser. No. 60/185,168, filed Feb. 25, 2000. This is a divisional application claiming priority from U.S. patent application Ser. No. 09/791,866 filed on Feb. 26, 2001 now issued as U.S. Pat. No. 6,485,611 on Nov. 26, 2002.

TECHNICAL FIELD AND INDUSTRIAL APPLICABILITY OF THE INVENTION

The invention relates to a method for smoothening a web in a papermaking operation before it is coated. The steps in the smoothening operation include calendering a moistened web in a heated hard nip. This process improves the receptivity of the web surface to coating applications, and to subsequent printing operations.

BACKGROUND OF INVENTION

It is known that an otherwise untreated web of paper or paperboard rawstock will react adversely to the application of a liquid by becoming rougher, since the surface fibers of the web absorb moisture leading to fiber swelling, breaking of hydrogen bonds and fiber reorientation. If the liquid application is in the form of a coating or the like, the web may actually become smoother because of the presence of smoothing ingredients in the coating, but the improvement in smoothness is not as great as would be expected because the surface of the rawstock beneath the coating becomes roughened in the presence of the liquid phase of the coating. Because of this phenomenon, and because one of the objectives in the production of paper and paperboard is to produce a smooth finish, it is desirable to smoothen the surface of the rawstock web before coating.

One of the known techniques for smoothing the surface of a web of paper or paperboard rawstock before coating is to pre-calender the web. This may be accomplished on a paper machine after the web is dried. In the pre-calendering step, the web is passed through one or more nips between the rolls of a calender, the nips providing a degree of compression to the paper surface to flatten the surface fibers, thereby creating a smoothened surface. The degree of finish obtained by this method depends upon the nip pressure reached in the calender. However, the smoothness obtained by pre-calendering a dried web is short lived when the web is subsequently brought into contact with water or a composition containing water, since dry cellulose fibers will not bond under pressure. On wetting, there will be substantial reorientation of the fibers at the web surface due to fiber swelling and release of stress. An improvement that alleviates this unwanted result is to moisten the dry web before pre-calendering. The compressing of moistened cellulose fibers will consolidate the web without undue stress, and the smoothened surface that is achieved will retain a substantial amount of its integrity for a longer time after wetting than is common for a web that is compressed in an essentially dry state.

Conventional processes for wet calendering employ either a water box on the calender, water sprays, or steam showers. In most cases, the quantity of moisture transferred to the web by these means is uneven, too great or too small, resulting in unsatisfactory results. Nevertheless, recent innovations in the paper industry have provided equipment that is capable of applying controlled amounts of water to a web in a uniform manner, particularly as disclosed in pending U.S. patent application Ser. No. 09/296,394, owned by the present assignee herein. The ability to apply a controlled amount of moisture to the web at the pre-calender yields better results. Nevertheless, there remains a need in the art to further enhance the process, and, accordingly, the present invention is designed to advance the process efficiency and product quality that can be achieved in a pre-calendering operation.

The importance of having a smooth rawstock surface and its effect on the printability of coated paper is well known. Pigmented coatings tend to hide or cover up some of the surface imperfections in a paper rawstock. However, the effectiveness of a coating in smoothing the surface of a paper web depends upon the condition of the surface on which the coating is applied. The effect on paper due to the application of a coating is discussed in the article entitled "Water-Paper Interaction During Paper Coating", by J. Skowronski and P. Lepoutre, published in the November 1985 issue of TAPPI Journal, at pages 98–102. Meanwhile, the effect of pretreatment or pre-calendering of a paper product before coating is discussed in the articles "Effect of Pretreatment of LWC Basestock on Coated Paper Properties", by P. Lepoutre, W. Bichard and J. Skowronski, published in the December 1986 issue of TAPPI Journal, at pages 66–70, and in the article entitled "Precalendering and its Effect on Paper-Coating Interaction", by G. Engstrom and J. F. Lafaye, published in the August 1992 issue of TAPPI Journal, at pages 117–122.

Likewise, the effect of applying moisture to a paper web before the web enters a calender nip, and various methods for making water application are also known, and are shown, for example, in U.S. Pat. Nos. 5,378,497; 5,505,820; 5,522,312; and 5,607,553, all owned by the present assignee herein. However, none of these prior art references deal with the concept of smoothening the web while reducing loss of bulk by drying the web to a very low moisture content before the application of moisture, passing it through a hard calender nip, and heating at least one roll of the calender nip as disclosed herein. Nor do the prior art references teach the use of the heated roll to dry the applied moisture as the web exits the calender nip as disclosed herein, especially in connection with a pre-calendering treatment on a paper machine.

SUMMARY OF THE INVENTION

The apparatus comprises at least one heated nip formed between two rolls, at least one of which is heated. The heated nip may be formed between one heated and one unheated roll or it may be formed between two heated rolls in a calender stack. The moisture application is made to the surface of the web that contacts the heated roll. One nip with controlled loading force will normally suffice, but multiple nips, in tandem or stacked may preferably be employed.

DETAILED DESCRIPTION OF THE PREFERRED EMBODIMENTS OF THE INVENTION

Figure 1:
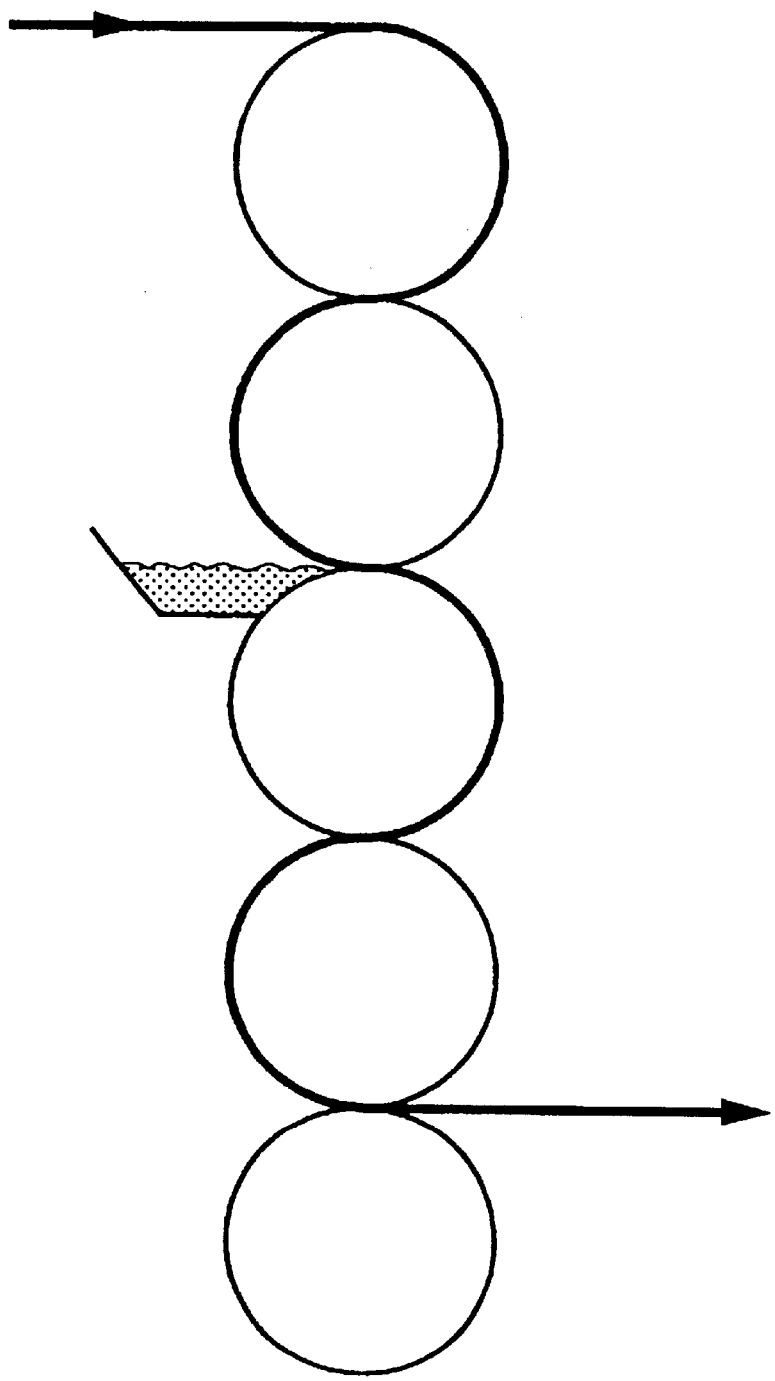
FIG. 1 is a side-elevation schematic view showing a prior art method for pre-calendering using a water box as a moisture application means.

FIG. 1 of the drawing illustrates a typical method for pre-calendering a paper or paperboard web on a paper machine prior to coating, as is known in the prior art. The paper web enters the pre-calender at a very low moisture content, on the order of about 1–2% moisture, although a moisture content of from about 0.5% to about 5% is possible. The typical installation for such a pre-calender consists of 5–8 rolls stacked directly over one another with an attached water box for applying moisture to the web. During conventional waterbox calendering, as the prior art process is termed, the amount of liquid applied to the web in the calender nip is such that the nip is flooded. Thus, the amount of water picked up by the web is determined by the calender roll diameter, operating speed, calender nip pressure, and web characteristics (e.g., thickness, sizing level, and roughness). Accordingly the amount of moisture applied to the web using a waterbox cannot be controlled independently of the operating characteristics of the calender. U.S. Pat. No. 5,522,312 discloses an example of how a water box can be modified to apply only a thin film of moisture to the web, but the operation of the calender as modified according to the '312 patent is not optimized. Patent application Ser. No. 09/296,394, previously herein incorporated by reference, discloses yet another water application method, which has proven to be an acceptable substitute for a water box and is the preferred method for applying moisture according to the present invention. This moisture application system comprises a source for introducing liquid onto the web and a metering device for scraping off excess liquid and assuring a uniform application. Metering of the applied liquid from the web can be achieved with the use of a blade, such as a doctor blade or a thin blade of the type and construction that would normally be used in a coating operation. Use of this blade applicator also contributes to minimizing loss of bulk in the web. In addition to the moisture application system disclosed in application Ser. No. 09/296,394, other alternatives may be used to apply or other finishing liquid used in the practice of the current invention. For example, the moisture application means may comprise a series of spray nozzles spaced evenly or in staggered arrangement across the roll diameter so as to provide sufficiently proximate streams of finishing liquid over the diameter of the web to provide even wetting of the entire web surface. Another spray type moisture application means is described in U.S. Pat. No. 5,607,553, the disclosure of which is herein incorporated by reference.

The amount of finishing liquid that is applied should be sufficient to coat the surface of the web but not penetrate through its entire thickness to avoid loss of bulk. An application means that therefore applies a minimal amount of liquid in a controlled fashion is desirable. For example, a spray nozzle applicator can be set to apply as little as about 1 lb./ream of liquid, based on a 3000 ft² ream size. A blade applicator, such as that described in application Ser. No. 09/296,394, ideally can apply amounts of liquid of from about 5 lb./ream up to about 10 lb./ream, or less. In contrast, the prior art waterbox calender configuration with a flooded nip typically applies amounts in excess of 10 lb./ream, resulting in deleterious effects on web bulk.

Figure 2:
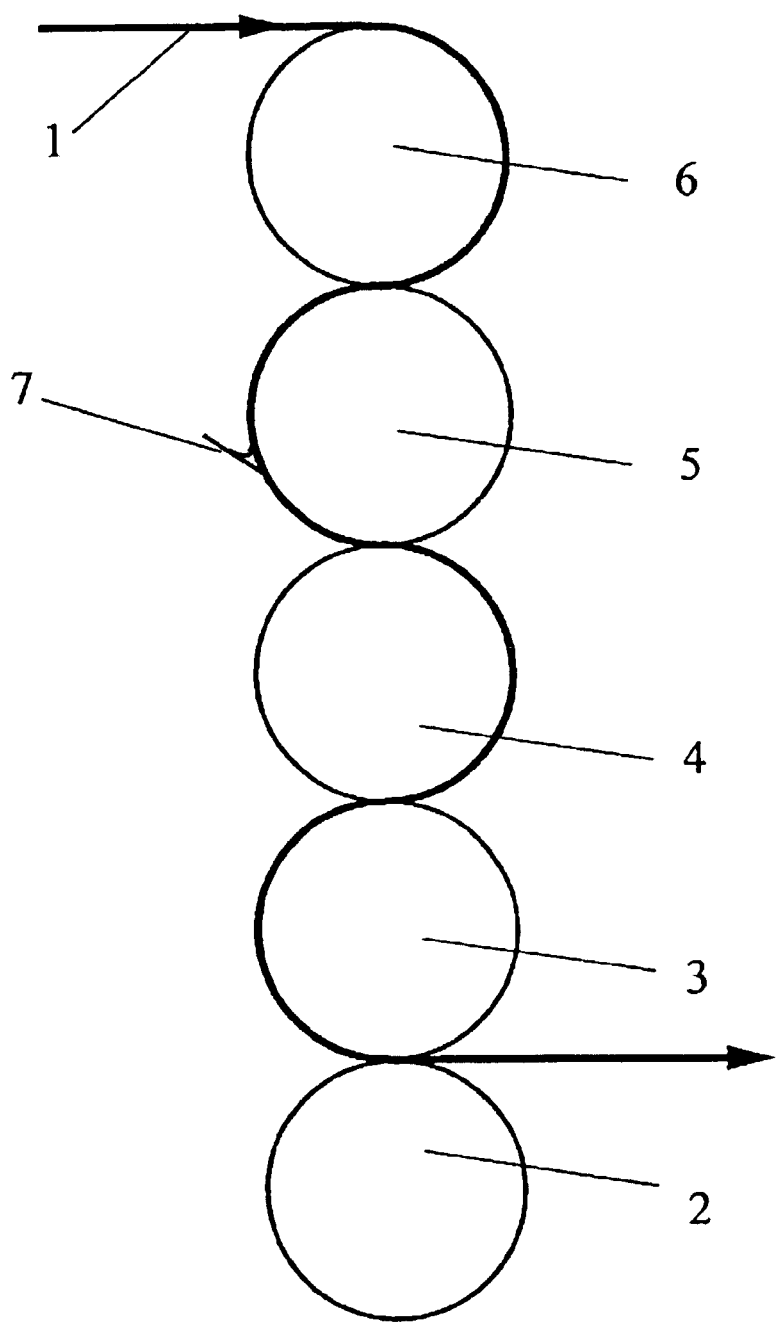
FIG. 2 is a side elevation schematic view showing an apparatus for practicing the invention wherein the moisture application means is a blade applicator.
Figure 3:
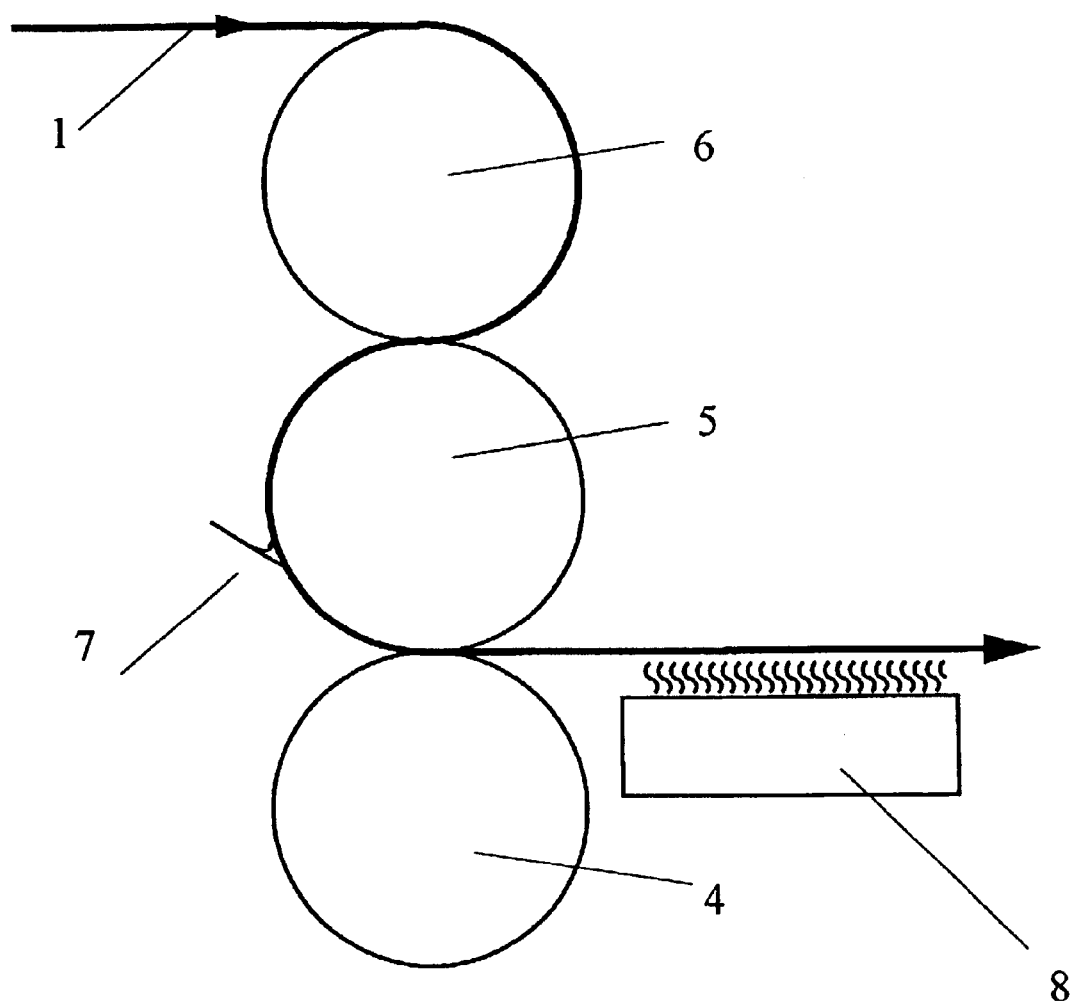
FIG. 3 is a side-elevation schematic view showing yet another embodiment of the present invention, in which an external heat source is employed to facilitate drying of the pre-calendered web.

In accordance with the present invention, the deficiencies of the prior art are overcome by adding heat to at least one hard calender roll that contacts the moistened side of the web so that some drying takes place during the calendering process. As shown in FIG. 2, a calender stack including unheated hard rolls 2, 3, 5, and 6 and heated roll 4 may be stacked in vertical configuration. A blade applicator 7, which comprises a moisture application means such as a series of nozzles, tubes or pipes in combination with a metering blade, as disclosed in application Ser. No. 09/296,394, is positioned proximal to roll 5 so as to deliver a metered amount of water or other finishing liquid to the surface of the web 1 before it enters the heated nip between rolls 4 and 5. The web 1, which at that point has absorbed some heat from the heated roll 4, is subsequently passed through nips formed by the lower rolls 2, 3 of the calender stack before exiting to coaters or offline storage (not shown). In the embodiment of FIG. 2, the web 1 is then partially wrapped around the surface of heated roll 4 after passing through the heated nip. FIG. 3 herein discloses an alternative method of practicing the present invention wherein external heat is applied to the web 1 after it exits the calender nip to facilitate further re-drying. In this respect, the web 1 is passed over a drier 8 or through any other conventionally used drying apparatus as an external heat source to remove additional moisture.

Figure 4:
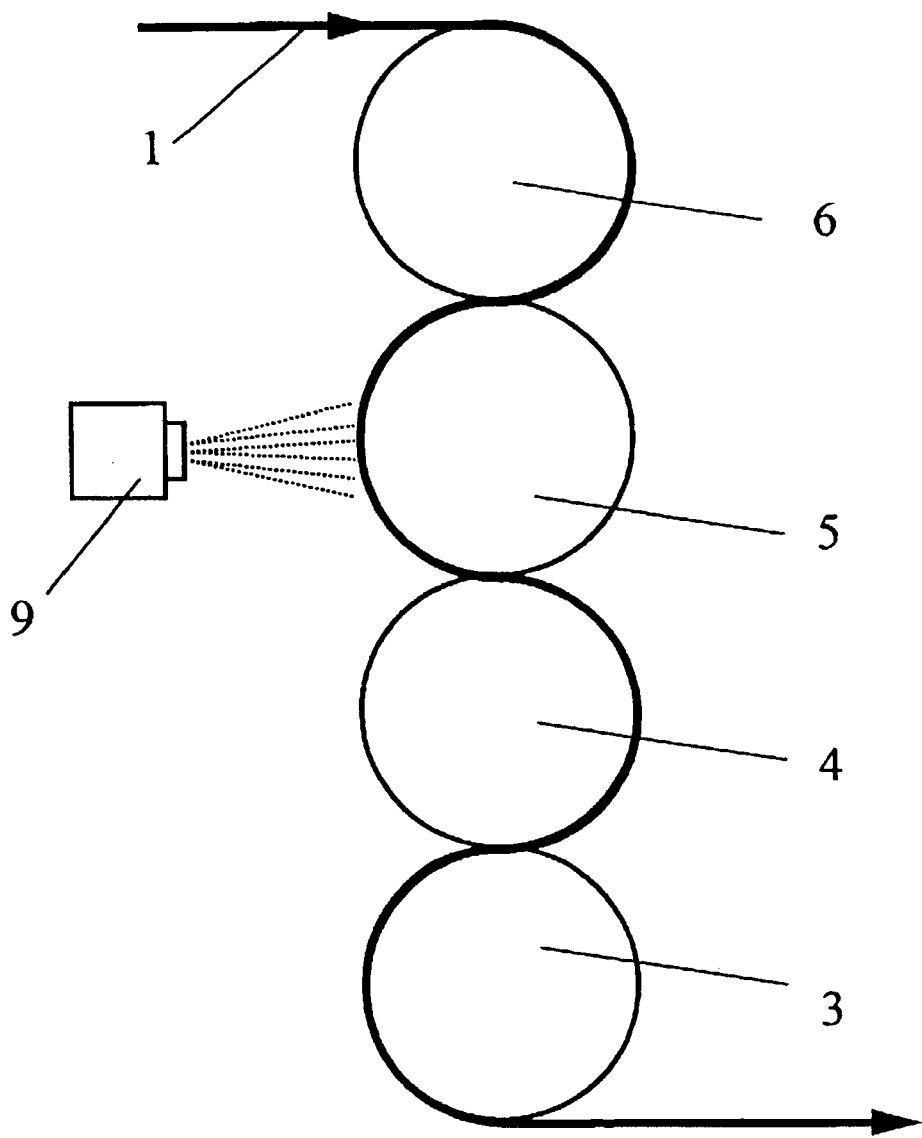
FIG. 4 is a side-elevation schematic view depicting an alternative embodiment of the present invention, in which the moisture application means is in the form of a series of spray nozzles.

In the alternative embodiment of FIG. 4, the spray nozzle moisture application means 9 is a series of evenly spaced nozzles, in serial or alternating arrangement, which evenly disperse droplets of the finishing liquid over the surface of web 1 before it passes through the heated nip between heated roll 4 and unheated roll 5.

The effect of a combination of moisture application as disclosed in the prior pending patent application mentioned above; the use of a hard calender nip; the application of heat to at least one calender roll which forms the nip; and, as an added option, the subsequent partial wrapping of the heated roll, provides an effective and efficient method for pre-calendering the web to achieve the desired results. The invention also provides improved smoothness results over a cold, wet calendering process.

EXAMPLES

Example 1

Preliminary experiments have shown that a pre-dried basestock at 1.75% moisture that was wet calendered at 80, 400 and 800 fpm using a 400 degree F. hot roll nipped with another steel roll, according to the invention, or with a suitable soft roll, produced essentially similar results. After pre-calendering at 800 fpm with about 6 lb./ream water applied, followed by coating of the pre-calendered basestocks, both the hot soft nip and the hot steel nip gave a 0.2 lb./caliper point lower density compared with cold wet calendering. In the case of the hot steel nip, the lowered density was correlated to post-wrap of about 6 inches around the hot roll. The lowered density was observed at approximately equal Parker PrintSurf or Sheffield.

Example 2

In another experiment a 10-point basestock (about 120 lbs./ream basis weight), was wet calendered at 80 fpm with a 340° F. hot roll using both a soft nip and a steel-steel nip. The web after exiting the nip was wrapped around the hot roll by varying distances up to about one foot. Both the hot, wet steel calendering and hot, wet soft calendering gave similar smoothness/density results. Meanwhile the presence or absence of post-nip drying by wrapping the hot roll did not significantly affect the smoothness/bulk characteristics.

It is believed that the present invention includes many other embodiments that may not be herein described in detail, but would nonetheless be appreciated by those skilled in the art from the disclosures made. Accordingly, this disclosure should not be read as being limited only to the foregoing examples or only to the designated preferred embodiments.

What is claimed is:

1. An apparatus for smoothening a paper or paperboard web comprising:
    a stack of adjacently placed hard rolls forming a plurality of nips, at least one of said hard rolls being heated; and
    a moisture application means comprising means a blade applicator and moisture nozzle positioned before the first of said at least one heated roll wherein at least some portion of said blade is in contact with the paper or paperboard web wherein said moisture application means provides moisture as a thin film to the surface of the web while the web is in contact with one of the rolls forming a heated nip with a heated roll just before the web enters the heated nip so that the moistened surface of the web contacts the heated roll.

2. The apparatus of claim 1, further comprising a web drier means located after said heated roll.

3. The apparatus of claim 1, wherein the temperature of the at least one heated roll is from about 300° F. to about 500° F.

4. The apparatus of claim 1 wherein said moisture application means has a means to meter the amount of moisture applied to the surface of the web.

5. The apparatus of claim 4 wherein said moisture application means further comprises a metering blade.

6. The apparatus of claim 1 wherein said moisture application means can provide moisture in the range of about 1 pound per 3,000 square feet of web to about 10 pounds per 3,000 square feet of web.

7. The apparatus of claim 1 wherein said moisture application means comprises a plurality of spray nozzles.

8. The apparatus of claim 1 wherein said apparatus is a pre-calender device located on a paper machine.

* * * * *